United States Patent [19]

Ho

[11] Patent Number: 4,967,220
[45] Date of Patent: Oct. 30, 1990

[54] MULTIPLE EXPOSURE STRUCTURE FOR A TWIN LENS CAMERA

[76] Inventor: Chin-Tien Ho, 1 Fl. No. 270, San Min Rd., Lu Chou Hsiang, Taipei Hsien, Taiwan

[21] Appl. No.: 120,697

[22] Filed: Nov. 9, 1987

[51] Int. Cl.⁵ ............................................. G03B 17/42
[52] U.S. Cl. ..................................... 354/204; 354/209
[58] Field of Search ................ 354/209, 207, 204, 213

[56] References Cited

U.S. PATENT DOCUMENTS

| | | | |
|---|---|---|---|
| 3,605,595 | 9/1971 | Irwin | 354/213 |
| 3,650,191 | 3/1972 | Nomura et al. | 354/209 |
| 3,687,039 | 8/1972 | Furuta et al. | 354/209 |
| 3,688,671 | 9/1972 | Irwin | 354/209 |
| 3,829,876 | 8/1974 | Uno et al. | 354/209 |
| 3,911,456 | 10/1975 | Umemura | 354/209 |
| 4,500,185 | 2/1985 | Haraguchi et al. | 354/209 |

FOREIGN PATENT DOCUMENTS 1440960  6/1976  United Kingdom ................ 354/209

Primary Examiner—A. A. Mathews
Attorney, Agent, or Firm—Lowe, Price, LeBlanc, Becker & Shur

[57] ABSTRACT

A single lens non-reflex camera or twin lens camera with multiple exposure structure which is composed of a body 1 of a camera, a shutter release member 2, a brake plate or locking member 3 and a shutter release 103. After first exposure has been made by pressing the shutter button release button 103 the shutter release member 2 can be re-cocked by operating a manually operable multiple exposure button 30 so that further exposure can be made by pressing the shutter release button 103 without operating the winder 9.

3 Claims, 4 Drawing Sheets

MULTIPLE EXPOSURE STRUCTURE FOR A TWIN LENS CAMERA

BACKGROUND OF THE INVENTION

The present invention relates to a camera with a double or multiple exposure facility.

The conventional single lens non-reflex camera or twin lens camera is not designed for multiple exposure. Single lens reflex (SLR) cameras which have a multiple exposure facility include a winder-release button which has to be pressed whilst the winder is operated to lock the shutter. Thus the practical operation of such cameras is complicated for the user. Therefore, the double exposure operation is not easy in SLR cameras and is impossible in single-lens non-reflex cameras.

SUMMARY OF THE INVENTION

The invention provides a camera having a winder coupled to a shutter release mechanism so as normally to prevent the camera shutter from being operated unless the film has been wound after the previous exposure, further comprising manually operable means arranged to cooperate with the shutter release mechanism to enable at least two exposures to be made without operating said winder.

Preferably the shutter release mechanism is normally cocked by operating said winder and released by operating a shutter-release button, wherein said manually operable means is arranged to re-cock the shutter-release mechanism to enable a further exposure to be made, without operating said winder, by operating said shutter release button. Such as comprising a shutter-release member biased by spring means, and a locking member which is movable between a first position in which it locks with said winter and maintains said shutter release member in a cocked position, and a second position in which it releases said shutter release member being movable to said second position by the operation of said shutter release button, said shutter release member being movable by said manually operable means to a position in which it is maintained by said locking member in said cocked position.

Embodiments of a non-reflex camera with multiple exposure facility according to the present invention will now be described by way of example, with reference to the drawings, in which:

BRIEF DESCRIPTION OF THE DRAWINGS

FIG. 2 is a perspective assembly view of the device of this invention with a portion of the case removed showing the shutter in the closed position.

FIG. 3 is a view similar to FIG. 2 showing the shutter in an open position

FIG. 4 is a perspective view of the device of this invention.

DETAILED DESCRIPTION OF THE INVENTION

Figure 1:
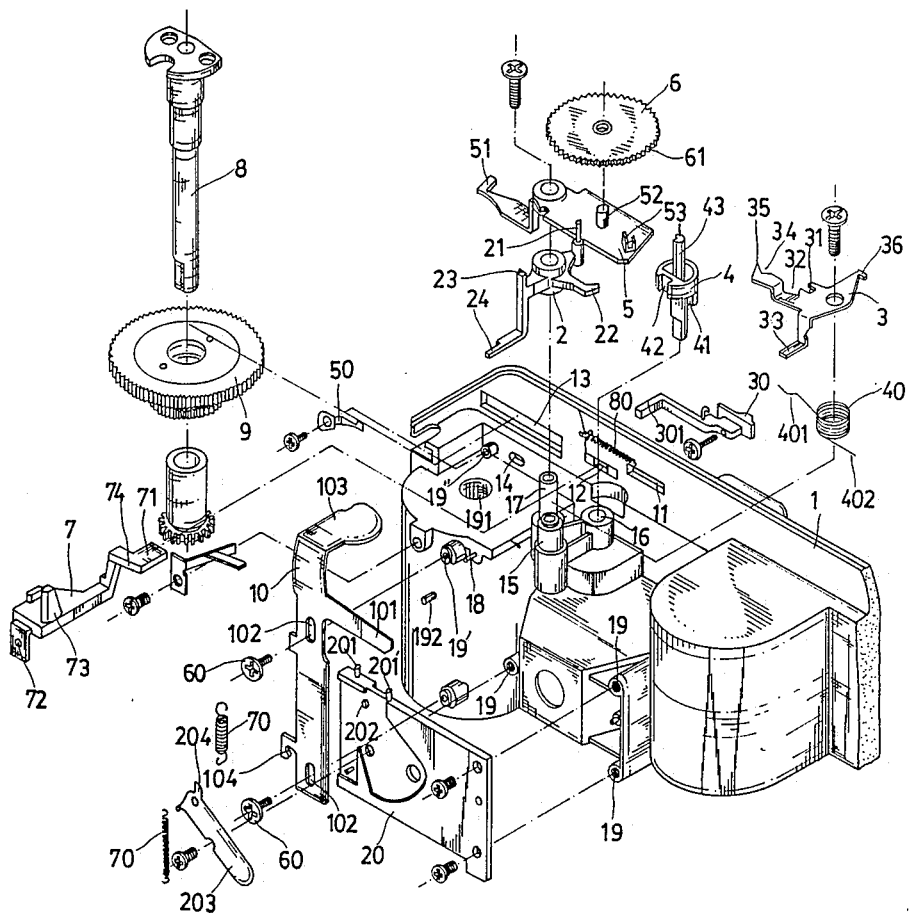
FIG. 1 is a perspective exploded view of a camera in accordance with the present invention.

Referring to FIGS. 1, 2, 3 and 4, the present invention comprises; a body of camera 1, a shutter brake or shutter release member 2, a brake plate or locking member 3, a reel 4, a rewinder 5, a frame counter 6, a winder release member 7, a fixed spool 8, a rotary switch or winder 9, a shutter release mechanism 10 and a shutter mount 20. A slot 11 is positioned at the body 1 to receive an exposure push button 30 and a spring 80 is positioned between the exposure button 30 and the body 1. A tab 71 of the winder release member 7 extends outwardly through a square hole 12. Part of the rotary winder 9 protrudes through an aperture 13 and an extended end 51 of the rewinder release mechanism 5 protrudes outwardly from an aperture 14. A compressive spring 40 is received in a stepped fixed axis axle 15 and a brake plate or locking member is positioned on the top of the compressive spring 40. The reel 4 is rotatably mounted in axial sleeve 16. The shutter brake or shutter release member 2 is received in sleeve 17, and the rewinder 5 is coupled with the shutter brake 2. A rod 18 extends through an axial hole 72 of winder release member 7 to enable the tab 71 of the front end to be positioned inside the square hole 12 of the body 1 and can be moved forwards and backwards. Several mounting screw holes 19 and 19' receive screws respectively to mount shutter mount 20 and the shutter release mechanism 10. A screw hole 19" is used to mount elastic strap 50, and the shutter brake 2 is mounted on rod 17 of the body 1 and in turn mounts axle 21. The lower part of brake 2 is biased by the bending end 401 of the compressive spring or spring lever 40 an axle part 21 engages the multiple exposure push button 30. An engaging part 22 positioned on one end cooperates with the notch 41 of the reel 4 and rod 23, positioned at the tope of the other end of member 2 engages the V-shaped gap 32 or the notch 31 of the brake plate 3. A shutter release rod 24 extends downwards between two pins 201, 201' of the shutter mount 20 to release the shutter 203, the brake plate 3 is positioned on the stepped axles 15, the compressive spring 4 is positioned between the stepped axle 15 and the brake plate 3, the bending end 401 of the compressive spring 40 is positioned at one side of the stepped axle 21 of the shutter brake 2 and the other extended end 402 is positioned at one side of the extended strip 33 of the brake plate 3. The notch 31 and the other V-shaped gap 32 are positioned at the brake plate 3, the front end of the V-shaped gap 32 extending to form a tip or detent 35. The tip 35 and the toothed wheel 9 of the winder engage each other; a recess 34 is positioned at edge of the tip 35 and can be engaged by or separated from the axial rod 73 of the winder release 7. The convex point 36 on the other side can be engaged with the groove 42 of the reel 4, and extended strip 33 on the other end is driven by the shutter release mechanism 10. The reel 4 is rotatably received in the axial sleeve 16 of the body 1 and includes a notch 41, a groove 42, and an axle rod 43 and can be engaged by or separated from the axle rod 43 and the frame counter 6. The rewinder release button 5 is mounted on the shutter brake 2, and an extended end 51 is positioned at the aperture 14 of the body 1. A pin 52 is rotatably mounted with the frame counter 6; a Ushaped flange 53 is blocked with one end of the spring, and the other end is fixed under the frame counter 6 for resetting the frame counter 6. The teeth 61 on the edge engage with axle rod 43 of the reel 4. The winder 7 is mounted on rod 18 of the body 1 at the hole 72 and the tab 71 extends through the square aperture 12 of the body 1. An axle rod 73 engages recess 34 of the brake plate 3, and inclined face 74 can drive the stepped axle 21 of the shutter brake 2.

The rotary switch or winder 9 is mounted on the hole 191 on the center of the body 1 to be mounted thereon by spool 8; the shutter release 10 is mounted at the screw hole 19, of the body 1 and can be manually depressed by operating the press button 103. A push part 101 is positioned to control the shutter-engaging rod 24 of the shutter release member 2. One end of the spring 70 is fixed by a hook 104 and the other end is fixed onto the axle 192 of the body 1. The shutter mount 20 is mounted in hole 19 of the body 1 by screw 60 and two convex rods 201, 201, are connected movably with a shutter strip 203 by an axle 202 and can drive to each other with the shutter rod 24 of the shutter brake 2 by the extended flange 204 of the shutter strip 203. A spring 70 is positioned on the shutter strip 203 and the body 1. Thus the elements above constitute a single lens non-reflex camera with multiple exposure facility.

Initially, the push rod 301 of the multiple exposure push button 30 and the stepped axle 21 of the shutter brake 2 are separated, the engaging part 22 of the shutter brake 2 and the reel notch 41 of the reel 4 are disengaged. The rod 23 is blocked at the V-shaped gap 32 of the brake plate 3, the shutter rod 24 is positioned at one side of the pin 201 and does not drive the shutter, and recess 34 of the brake plate 3 and the axial rod 73 of the winder release 7 are locked to each other. The tip 35 on the front blocks the rotary winder 9 and prevents the latter from rotating, and the extended strip 33 is not engaged by the extension 101 of the shutter release 10 as shown in FIG. 2.

To make a double exposure, the press strip 103 of the shutter release 10 has to be pressed, enabling the shutter release mechanism 10 to move downwardly and return back rapidly by the action of the spring 70. The extended strip 33 of the brake part 101 of the shutter release 10, and simultaneously the V-shaped gap 32 of the brake plate 3 and the rod 23 of the shutter brake 2 are separated. Consequently the compressive spring 4 drives the rod 23 of the shutter brake 2 into the gap 31. Accordingly the shutter release member 2 is released and the rod 24 rapidly opens the shutter 203. Thus the first exposure is made (as shown in FIG. 3). At this moment, if a second exposure is desired, the multiple exposure push button 30 has to be operated to enable the push rod 301 of the multiple exposure push button 30 to engage the stepped axle 21 of the shutter release member "shutter brake" 2 and returns it to the cocked position as shown in FIG. 2. Then the user presses the shutter release 10 again to enable it to make a further exposure as shown in FIG. 3. The user rotates the rotary winder 9 to drive the reel 4 and wind the film.

Figure 2:
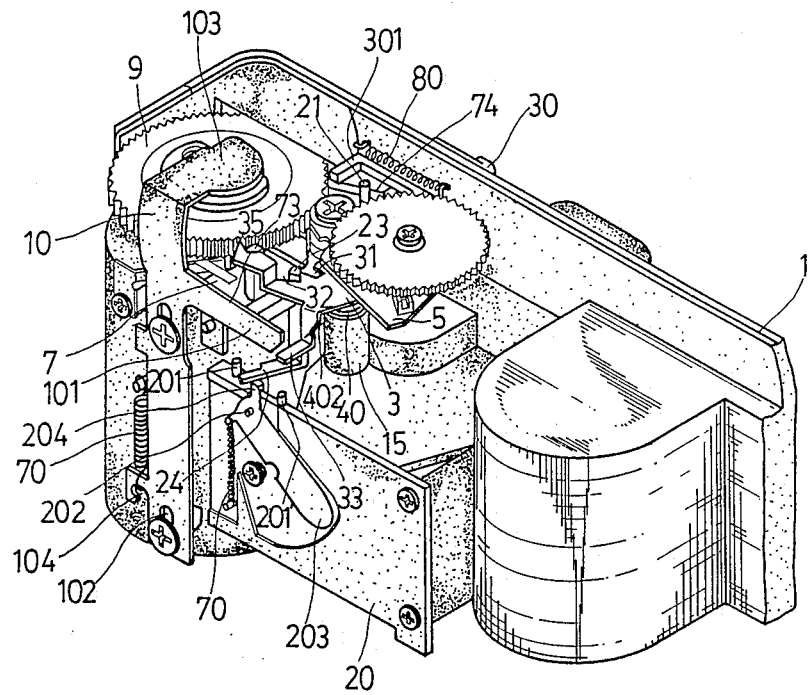
FIG. 2 is a perspective view of the assembled camera of FIG. 1.
Figure 3:
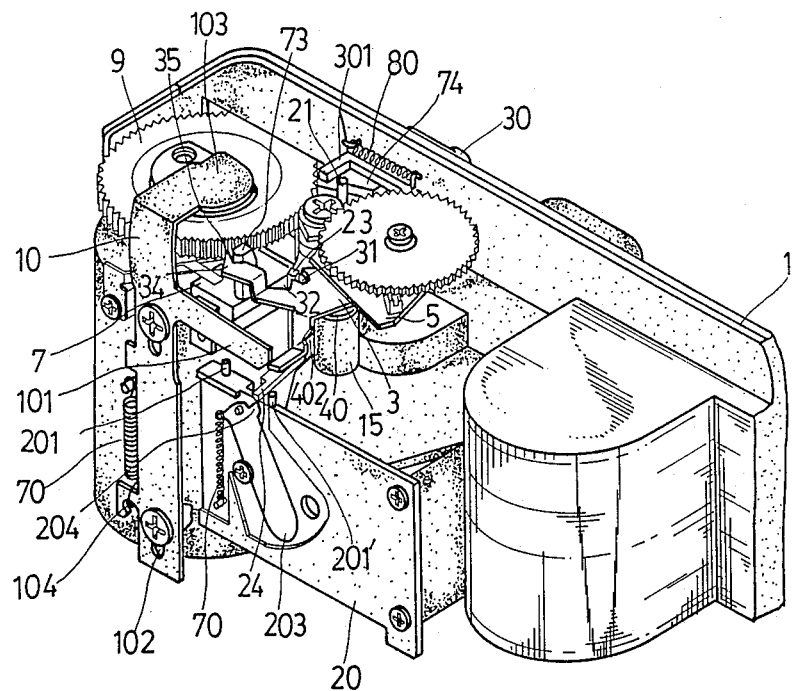
FIG. 3 is a view similar to that of FIG. 2, showing the shutter opening.
Figure 4:
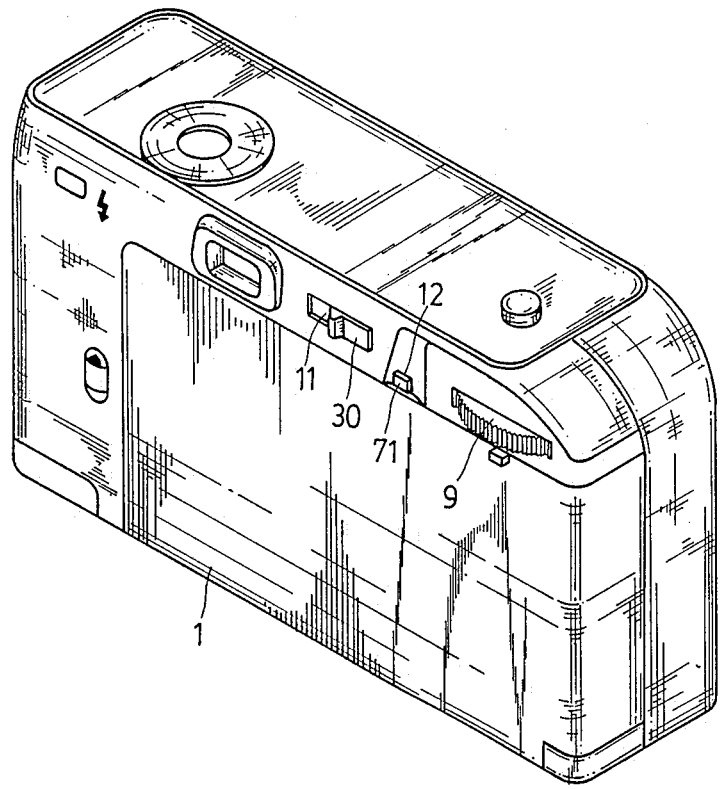
FIG. 4 is a perspective view of the camera of FIGS. 1 to 3, in the reverse direction.

In other words, when the shutter release mechanism 10 is pressed, the extension 33 from brake plate 3 is displaced to the right as shown in FIGS. 1 to 3 (to the left from the view point of the user) by inclined edge 101, thereby releasing detent 35 from the teeth of the winder wheel 9. The movement of the brake plate or locking member 3 releases the extension 23 from the V-shaped gap 32 and accordingly the handing and 401 of spring lever 40 drives the extension 23 into gap 31 and drives 24 of the shutter release member 2 into engagement with the projection 204 of shutter 203. As a result the shutter opens and closes rapidly to make the first exposure. In order to enable a further exposure to be made, the shutter release member 2 has to be re-cocked, which is normally achieved by winding on the film with the winder 9. However, if a second exposure on the same frame of film is desired, the multiple exposure button may be slid to the left by the user (to the right from the view point of FIGS. 1 to 3) so that the end 301 thereof engages projection 21 of shutter release member 2 and swings the other end 24 of this member over to the left from the view point of FIGS. 1 to 3, sliding over projection 204 of shutter 203. In this position it is in a cocked condition and can be released in the normal way by pressing the button 103 of the shutter release 10.

If it is desired to make multiple exposures, all the procedures are the same as double exposure, except that the multiple exposure push button 30 is operated repeatedly.

After operating the exposure push button 30 it returns to its original position by the action of the spring 80.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

I claim:

1. A non-reflex camera having a winder coupled to a shutter release mechanism including a shutter release member so as normally to prevent the camera shutter from being operated unless the film has been wound after the previous exposure, said mechanism normally being cocked by operating said winder and released by operating said shutter release member comprising: manually operable means arranged to cooperate with the shutter release mechanism for enabling at least two exposures to be made without operating said winder, said manually operable means being arranged to re-cock the shutter release mechanism to enable a further exposure to be made, without operating said winder, by operating said shutter release member.

2. A camera as claimed in claim 1 comprising a shutter release member biased by spring means and a locking member which is movable between a first position in which the locking member locks with said winder and maintains said shutter release member in a cocked position, and a second posiion in which the locking member releases said shutter release member, said shutter release member being movable by said manually operable means to a position in which it is maintained by said locking member in said cocked position.

3. A camera as claimed in claim 2 wherein said manually operable means comprises a resiliently biased operating member which protrudes from the camera body.

* * * * *